United States Patent
Ndong et al.

(10) Patent No.: US 11,186,758 B2
(45) Date of Patent: Nov. 30, 2021

(54) SHEAR RECOVERY FOR VISCOSIFYING SURFACTANTS IN STIMULATION FLUIDS

(71) Applicant: RHODIA OPERATIONS, Paris (FR)

(72) Inventors: Rose Ndong, Plainsboro, NJ (US); Genyao Lin, Pittsburgh, PA (US); Subramanian Kesavan, East Windsor, NJ (US); Louis Villafane, Pittsburgh, PA (US); Jian Zhou, Langhorne, PA (US)

(73) Assignee: RHODIA OPERATIONS, Aubervilliers (FR)

( * ) Notice: Subject to any disclaimer, the term of this patent is extended or adjusted under 35 U.S.C. 154(b) by 0 days.

(21) Appl. No.: 15/605,065

(22) Filed: May 25, 2017

(65) Prior Publication Data
US 2017/0342313 A1 Nov. 30, 2017

Related U.S. Application Data

(60) Provisional application No. 62/341,251, filed on May 25, 2016.

(51) Int. Cl.
| | | |
|---|---|---|
| C09K 8/86 | (2006.01) | |
| C09K 8/035 | (2006.01) | |
| C09K 8/60 | (2006.01) | |
| C09K 8/88 | (2006.01) | |

(52) U.S. Cl.
CPC .............. *C09K 8/035* (2013.01); *C09K 8/602* (2013.01); *C09K 8/86* (2013.01); *C09K 8/88* (2013.01)

(58) Field of Classification Search
CPC . C09K 8/90; C09K 8/68; C09K 8/512; C09K 2208/26; C09K 8/035; C09K 8/52; C09K 8/74; C09K 8/70; C09K 8/62; C09K 8/64; C09K 8/92; C09K 8/03; C09K 8/514; C09K 8/706; C09K 8/80; C09K 8/86; C09K 8/88; C09K 8/08; C09K 8/12; C09K 8/588; C09K 8/487; C09K 8/506; C09K 8/516; C09K 8/524; C09K 8/5753; C09K 8/582; C09K 8/703; C09K 8/72; C09K 8/725; C09K 8/76; C09K 8/82; C09K 8/032; C09K 8/20; C09K 8/206; C09K 8/24; C09K 8/46; C09K 8/502; C09K 8/528; C09K 8/56; C09K 8/58; C09K 8/584; C09K 8/60; C09K 8/605; C09K 8/885; C09K 8/905; E21B 43/25; E21B 43/16; E21B 43/26; E21B 43/267; E21B 43/04; E21B 33/138; E21B 37/06; E21B 41/02; E21B 2043/0115; E21B 43/025

See application file for complete search history.

(56) References Cited

U.S. PATENT DOCUMENTS

| | | | |
|---|---|---|---|
| 5,916,967 A | 6/1999 | Jones et al. | |
| 7,279,446 B2 * | 10/2007 | Colaco | C09K 8/584 |
| | | | 507/119 |
| 7,387,987 B2 | 6/2008 | Chen et al. | |
| 7,427,583 B2 | 9/2008 | Couillet et al. | |
| 7,678,742 B2 * | 3/2010 | Munoz, Jr. | C09K 8/5086 |
| | | | 175/72 |
| 7,786,179 B2 | 8/2010 | Talingting-Pabalan et al. | |
| 7,897,547 B1 | 3/2011 | Lin et al. | |
| 2005/0107503 A1 | 5/2005 | Couillet et al. | |
| 2006/0105919 A1 | 5/2006 | Colaco et al. | |
| 2007/0281869 A1 | 12/2007 | Drochon et al. | |
| 2008/0070805 A1 | 3/2008 | Munoz et al. | |
| 2010/0326658 A1 | 12/2010 | Milne et al. | |
| 2011/0262293 A1 | 10/2011 | Heinzel et al. | |
| 2013/0324443 A1 * | 12/2013 | Wang | C04B 24/163 |
| | | | 507/121 |
| 2014/0066304 A1 * | 3/2014 | Alexander | A01N 39/04 |
| | | | 504/128 |
| 2014/0262293 A1 | 9/2014 | Song et al. | |

FOREIGN PATENT DOCUMENTS

| | | | |
|---|---|---|---|
| CN | 104194763 | * | 12/2014 |
| EA | 008273 | | 4/2007 |
| RU | 2244814 C1 | | 1/2005 |
| RU | 2432458 C2 | | 10/2011 |
| RU | 2545193 C2 | | 3/2015 |
| RU | 2546697 C1 | | 4/2015 |
| WO | 2011126964 A1 | | 10/2011 |

OTHER PUBLICATIONS

Hirasaki, George J., et al., "Separation of Produced Emulsions from Surfactant Enhanced Oil Recovery Processes", Presented at the 11th International Conference on Petroleum Phase Behavior and Fouling, Energy & Fuels Article, American Chemical Society, Aug. 15, 2010, pp. A-G.

Office Action issued in corresponding Russian Application No. 2018140735; dated Aug. 31, 2020 (17 pages).

* cited by examiner

*Primary Examiner* — Kumar R Bhushan
(74) *Attorney, Agent, or Firm* — Osha Bergman Watanabe & Burton LLP

(57) ABSTRACT

A method of reducing shear recovery time of a viscosifying surfactant fluid system that includes introducing a viscosifying surfactant fluid system into a subterranean formation, wherein the fluid includes a major portion of a surfactant and a hydrophobically-modified associative polymer in a concentration sufficient to shorten the shear recovery time of the fluid system compared to the shear recovery time of the fluid system without the polymer.

8 Claims, No Drawings

SHEAR RECOVERY FOR VISCOSIFYING SURFACTANTS IN STIMULATION FLUIDS

CROSS-REFERENCE TO RELATED APPLICATION

The present application claims the benefit of priority under 35 U.S.C. § 119(e) of U.S. Provisional Application Ser. No. 62/341,251, filed on May 25, 2016, the entire disclosure of which is incorporated herein by reference.

BACKGROUND

Viscosifying surfactant fluids have continued to grow in use in oilfield applications because of their advantages over conventional polymer systems. Such advantages include higher permeability in the oil bearing zone, lower formation or subterranean damage, higher viscosifier recovery after fracturing, elimination of need for enzymes or oxidizers to break down viscosity, and easier hydration and faster build-up to optimum viscosity.

However, use of viscosifying surfactants at low concentrations can result in unacceptably long shear recovery time after high shear operation. Accordingly, it would be desirable to have a fluid that maintains a high level of viscosity performance at high temperatures and shear recovery comparable to fluids with a relatively high concentration of viscosifying surfactants.

SUMMARY

The present disclosure provides a method of reducing shear recovery time of a viscosifying surfactant fluid system that includes introducing a viscosifying surfactant fluid system into a subterranean formation, wherein the fluid includes a major portion of a surfactant and a hydrophobically-modified associative polymer in a concentration sufficient to shorten the shear recovery time of the fluid system compared to the shear recovery time of the fluid system without the polymer.

In an embodiment, the surfactant is selected from Formulas I, II, III, IV, and combinations thereof. In an embodiment, the hydrophobically-modified associative polymer (AP) includes at least one water-soluble part selected from acrylamide, methacrylamide, acrylic acid, methacrylic acid, 2-acrylamidomethylpropanesulfonic acid, N-vinyl pyrrolidone, N-vinyl formamide, and mixtures thereof. In another embodiment, the AP includes at least one water-insoluble part selected from the group consisting of straight or branched alkyl or alkylaryl alcohol esters of acrylic or methacrylic acid, straight or branched alkyl or alkylaryl amides of acrylamide or methacrylamide, styrene, butadiene, 1-vinylnaphthalene, and mixtures thereof.

DETAILED DESCRIPTION

Methods for reducing the shear recovery time of viscosifying surfactant fluid systems are provided. In an embodiment, the method includes introducing a viscosifying surfactant fluid system into a subterranean formation, wherein the fluid includes a major portion of a surfactant and a hydrophobically-modified associative polymer (AP) as a shear recovery agent (SRA) in a concentration sufficient to shorten the shear recovery time of the fluid system compared to shear recovery time of the fluid system without the SRA.

In an embodiment, the viscosifying surfactant is selected from Formulas I, II, III, IV, and combinations thereof:

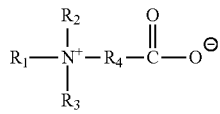

Formula I

In Formula I, $R_1$ is selected from alkyl, alkenyl, alkylarylalkylene, alkenylarylalkylene, alkylaminoalkylene, alkenylamino-alkylene, alkylamidoalkylene, or alkenylamidoalkylene, wherein each of said alkyl groups contain from about 14 to about 24 carbon atoms and may be branched or straight chained and saturated or unsaturated, and wherein said alkylene groups have from about 1 to about 6 carbon atoms. $R_2$, $R_3$ and $R_4$ are the same or different and are alkyl or hydroxyalkyl of from 1 to about 5 carbon atoms, or $R_3$ and $R_4$ or $R_2$ together with the nitrogen atom to which they are bonded form a heterocyclic ring of up to 6 members.

In an embodiment, the surfactant of Formula I is selected from oleyl amidopropyldimethyl betaine:

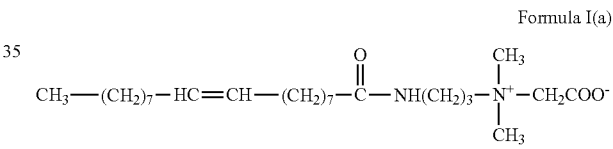

Formula I(a)

and tallow dihydroxyethyl glycinate:

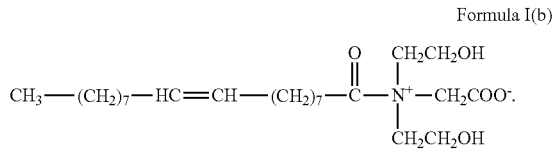

Formula I(b)

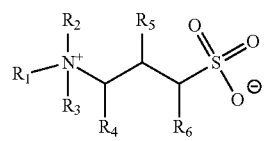

Formula II

In Formula II, $R_1$ is a hydrocarbyl group that may be branched or straight-chain, aromatic, aliphatic or olefinic and contains from about 8 to about 30 carbon atoms. In an embodiment, $R_1$ is ethoxylated. $R_2$, $R_3$ individually hydrogen it a methyl group; $R_4$ and $R_5$ or $R_6$ are individually hydrogen or a hydroxyl group with the provision that at least one of the $R_4$ and $R_5$ or $R_6$ is a hydroxyl groups.

In an embodiment, the surfactant of Formula II is selected from erucyl amidopropyl hydroxypropyl sulfobetaine:

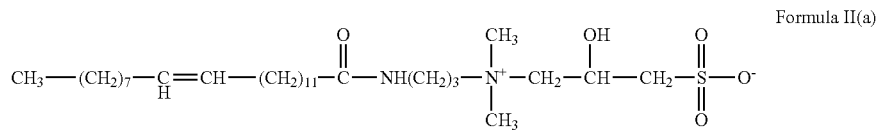

Formula II(a)

and 3-(N-erucamidopropyl-N,N-dimethyl ammonium) propane sulfonate (EDAS):

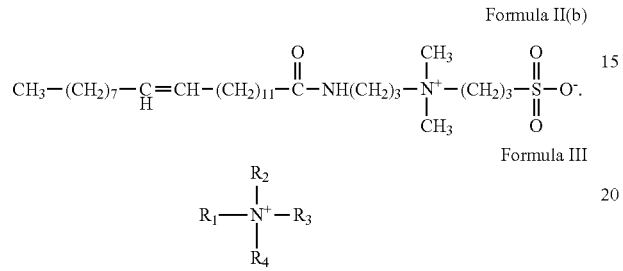

Formula II(b)

Formula III

In Formula III, $R_1$ is a hydrocarbyl group that may be branched or straight-chain, aromatic, aliphatic or olefinic and contains from about 8 to about 30 carbon atoms. In an embodiment, $R_1$ is ethoxylated. $R_2$, $R_3$ and $R_4$ are the same or different and are alkyl or hydroxyalkyl of from 1 to about 5 carbon atoms, or $R_3$ and $R_4$ or $R_2$ together with the nitrogen atom to which they are bonded form a heterocyclic ring of up to 6 members.

In an embodiment, the surfactant of Formula III is selected from stearyl trimethyl ammonium chloride:

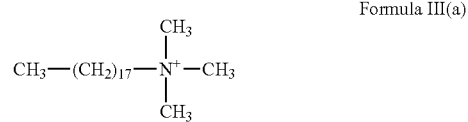

Formula III(a)

and erucyl amidopropyl trimethyl ammonium:

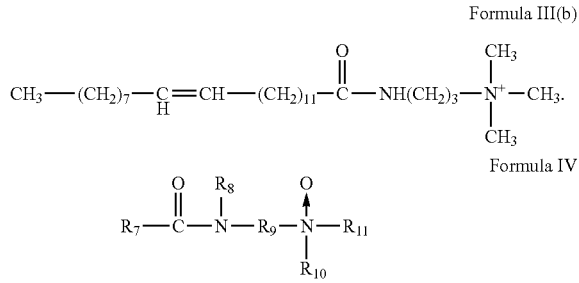

Formula III(b)

Formula IV

In Formula IV, $R_7$ is a saturated or unsaturated, straight or branched chain aliphatic group of from about 7 to about 30 carbon atoms, $R_9$ is a straight or branched chain, saturated or unsaturated divalent alkylene group of from 2 to about 6 carbon atoms, $R_{10}$ and $R_{11}$ are the same or different and are alkyl or hydroxyalkyl of from 1 to about 4 carbon atoms, or $R_{10}$ and $R_{11}$ together with the nitrogen atom to which they are bonded form a heterocyclic ring of up to 6 members, and $R_8$ is hydrogen or a alkyl or hydroxyalkyl group of from 1 to about 4 carbon atoms.

In an embodiment, the surfactant of Formula IV includes tallow amidopropyl dimethylamine oxide:

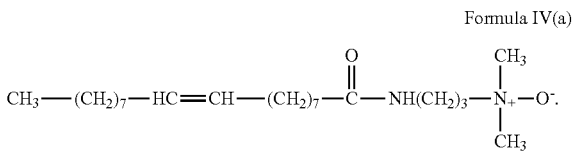

Formula IV(a)

The shear recovery agent or rheology enhancer is a hydrophobically-modified associative polymer (AP) that is water-soluble, but includes one or more water-insoluble short blocks. In an embodiment, the water-soluble part is selected from acrylamide, methacrylamide, acrylic acid, methacrylic acid, 2-acrylamidomethylpropanesulfonic acid, N-vinyl pyrrolidone, N-vinyl formamide, and mixtures thereof. In an embodiment, the water insoluble part having hydrophobic properties is selected from straight or branched alkyl or alkylaryl alcohol esters of acrylic or methacrylic acid, straight or branched alkyl or alkylaryl amides of acrylamide or mathacrylamide, styrene, butadiene, 1-vinylnaphthalene and mixtures thereof.

In another embodiment, the hydrophobically-modified associative polymer is a copolymer including monomers selected from anionic monomers, cationic monomers, non-ionic monomers, hydrophobically-modified monomers, and combinations thereof. Non-limiting examples of anionic monomers include acrylic acid and 2-Acrylamido-2-methylpropane sulfonic acid. A non-limiting example of a non-ionic monomer includes acrylamide. A non-limiting example of a cationic monomer includes acryloyloxyethyltrimethylammonium chloride (AETAC). In an embodiment, the hydrophobically-modified monomer is an anionic monomer (e.g. acrylic acid) linked to a hydrophobe via direct carbon-carbon bond, ester bond or amide bond. Non-limiting examples of such hydrophobic monomers include, but not limited to, stearyl acrylate, octadecyl dimethyl allyl ammonium chloride, and n-lauryl-2-methyl-acrylamide. An example of a hydrophobically-modified associative polymer (AP) is poly (acrylic acid)-co-(2-acrylamido-2-methylpropanesulfonic acid) with ethylhexyl acrylate as the hydrophobic monomer. Non-limiting, illustrative hydrophobic monomers are given below.

In an embodiment, the associative hydrophobic monomer of the water-insoluble part possesses a structure selected from Formulae (V)-(IX) and combinations thereof.

Formula V wherein $R_1$ is selected from H or $CH_3$ and $R_2$ is selected from (i) esters of α,β-ethylenically unsaturated, branched or straight mono- or dicarboxylic acid with $C_2$-$C_{30}$ alkanols (for example n-undecyl (meth)acrylate, ethylhexyl (meth)acrylate);

(ii) esters of vinyl or allyl alcohol with $C_1$-$C_{30}$ monocarboxylic acids, for example vinyl formate;

(iii) primary amides of α,β-ethylenically unsaturated mono- and dicarboxylic acids and N-alkyl and N,N-dialkyl derivatives, such as N-propyl(meth)acrylamide;

(iv) N-vinyllactams and its derivatives, such as N-vinyl-5-ethyl-2-pyrrolidone;

(v) esters of α,β-ethylenically unsaturated mono- and dicarboxylic acids with aminoalcohols, for example N,N-dimethylaminocyclohexyl (meth)acrylate;

(vi) amides of α,β-ethylenically unsaturated mono- and dicarboxylic acids with diamines comprising at least one primary or secondary amino group, for example N-[4-(dimethylamino)butyl]acrylamide; and (vii) monoolefins ($C_2$-$C_8$) and nonaromatic hydrocarbons comprising at least two conjugated double bonds, for example ethylene, isobutylene and the like.

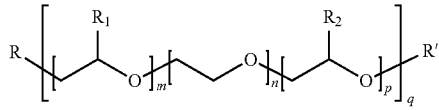

Formula VI where m, n, p and q are integers and m, n, p are less than 150, q is greater than 0, and at least one integer among m, n and p is non-zero, R has a polymerizable vinylic function, $R_1$, and $R_2$ are identical or different, and represent hydrogen atoms or alkyl groups; R' is a hydrophobic group comprising at least 6 and at most 36 carbon atoms, preferentially at least 12 and at most 24 carbon atoms, and very preferentially at least 18 and at most 22 carbon atoms.

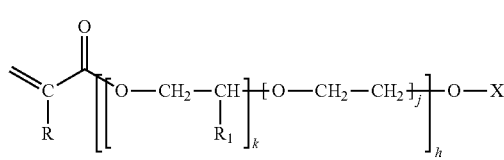

Formula VII wherein R is H or $CH_3$; wherein $R_1$ is a —$(CH_2)_p$H alkyl chain; wherein p is an integer from 1 to about 4; wherein j is an integer from 1 to about 50; wherein k is an integer from 0 to about 20, wherein h is 1 or 2; and wherein X has the following structure:

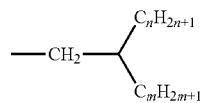

wherein m and n are, independently, positive integers from 1 to 39 and m+n represents an integer from 4 to 40.

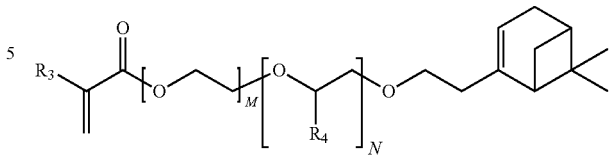

Formula VIII wherein $R_3$ is H or $CH_3$; $R_4$ is an alkyl chain containing 1 to about 4 carbons; M is an integer from 1 to about 50; and N is 0 or an integer of less than or equal to M.

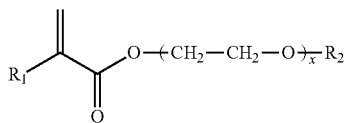

Formula IX wherein $R_1$ is H or $CH_3$; x is an integer from 5 to about 50, $R_2$ is an alkyl chain containing 1 to about 32 carbons or a cycloalkyl ring or a single aromatic 4-6 membered ring.

In an embodiment, the AP is present in a concentration sufficient to shorten the shear recovery time of the fluid. In another embodiment, the concentration of shear recovery agent ranges from 0.005 wt % to 5 wt %, preferably from 0.01 wt % to 0.1 wt %. In an embodiment, following exposure to high shear conditions (>500/s), the fluid recovers at least 50% of its final viscosity within 50 seconds. In another embodiment, the fluid recovers 50% of its final viscosity between 15-30 seconds. In an embodiment, the SRA is selected from hydrophobically-modified associative polymers (AP) having a molecular weight of at least 500 gm/mol or mixtures thereof. In general, the addition of AP having molecular weights greater than 25,000 gm/mol was found to be effective at higher concentrations of viscosifying surfactant fluid.

In an embodiment, the method includes introducing a viscosifying surfactant fluid system into a subterranean formation, wherein the fluid system includes a major portion of a surfactant and a hydrophobically-modified associative polymer (AP) as a shear recovery agent (SRA) in a concentration sufficient to shorten the shear recovery time of the fluid system compared to shear recovery time of the fluid system without the SRA. The fluid system is useful in many oilfield applications, including, but not limited to, fracturing and completion operations.

In an embodiment, the fluid system further includes at least one solvent selected from water, alcohols, and combinations thereof. In an embodiment, the fluid system includes an alcohol selected from monohydric alcohols, dihydric alcohols, polyhydric alcohols, and combinations thereof. In another embodiment, the fluid system includes an alcohol selected from alkanols, alcohol alkoxylates, and combinations thereof. In another embodiment, the fluid system includes an alcohol selected from methanol, ethanol, isopropanol, butanol, propylene glycol, ethylene glycol, polyethylene glycol, and combinations thereof.

Optionally, the fluid system further includes one or more additives. In an embodiment, the fluid includes one or more additives selected from corrosion inhibitors, iron control agents, clay stabilizers, calcium sulfate inhibitors, mutual solvents, and combinations thereof. In an embodiment, the corrosion inhibitor is selected from alcohols (e.g. acetylenics); cationics (e.g. quaternary ammonium salts, imidazolines, and alkyl pyridines); and nonionics (e.g. alcohol ethoxylates).

In an embodiment, the shear recovery time is determined using one or both of the following two methods (Methods A and B). Method A is a visual observation after the fluid is sheared at high speeds and it "lips" back when shear is stopped. This lip method includes measuring the time it takes for the fluid to snap back when poured from an inclined upper beaker or cup containing the fluid. In an another embodiment, the shear recovery time can be measured on a rheometer by shearing the fluid at 935/s for 30 seconds, then monitoring the time it takes for the fluid to reach a final steady state value. The shear recovery time is then defined as the time it takes for the viscosity to reach 50% of its final equilibrium value at 100/s (Method B).

While specific embodiments are discussed, the specification is illustrative only and not restrictive. Many variations of this disclosure will become apparent to those skilled in the art upon review of this specification.

The present disclosure will further be described by reference to the following examples. The following examples are merely illustrative and are not intended to be limiting. Unless otherwise indicated, all percentages are by weight of the total composition.

Example 1

Various formulations containing a certain amount of active surfactant were mixed in water or brines with or without a shear recovery agent (SRA) for 5 minutes at 7000 rpm. After an additional 20 seconds, the fluid was poured from a blender to a beaker and the time it took to "lip" was measured as outline in Method A. As an illustrative example, a mixture of 2.6% active erucyl quat in 6% KCl had a shear recovery time greater than 180 seconds without any shear recovery agent compared with 17 and 12 seconds with the addition of 0.01 wt. % and 0.015 wt. % SRA, respectively, using Method A. In another example, the addition of 0.12 wt. % SRA-2 to a 1.85 wt. % active oleyl betaine in 6 wt. % KCl exhibited a shear recovery time of 6 seconds, as compared to >180 seconds without the SRA-2 as measured by Method A.

TABLE 1

Shear recovery time results.

| Surfactant active % | SRA wt % | Shear recovery time by lip method seconds |
|---|---|---|
| 2.7 | 0 | >180 |
| 2.7 | 0.010 | 17 |
| 2.7 | 0.015 | 13 |
| 2.7 | 0.013 | 14 |
| 2.7 | 0.090 | 16 |
| 2.7 | 0.510 | 5 |

The disclosed subject matter has been described with reference to specific details of particular embodiments thereof. It is not intended that such details be regarded as limitations upon the scope of the disclosed subject matter except insofar as and to the extent that they are included in the accompanying claims.

Therefore, the exemplary embodiments described herein are well adapted to attain the ends and advantages mentioned as well as those that are inherent therein. The particular embodiments disclosed above are illustrative only, as the exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components, substances and steps. As used herein the term "consisting essentially of" shall be construed to mean including the listed components, substances or steps and such additional components, substances or steps which do not materially affect the basic and novel properties of the composition or method. In some embodiments, a composition in accordance with embodiments of the present disclosure that "consists essentially of" the recited components or substances does not include any additional components or substances that alter the basic and novel properties of the composition. If there is any conflict in the usages of a word or term in this specification and one or more patent or other documents that may be incorporated herein by reference, the definitions that are consistent with this specification should be adopted.

We claim:

1. A method of reducing shear recovery time of a viscosifying surfactant fluid system comprising introducing a viscosifying surfactant fluid system into a subterranean formation, wherein the fluid comprises a major portion of a surfactant and a hydrophobically-modified associative polymer consisting of two water-soluble monomers selected from the group consisting of acrylamide, methacrylamide, acrylic acid, methacrylic acid, 2-acrylamido-2-methylpropanesulfonic acid, N-vinyl pyrrolidone, and N-vinyl formamide and a hydrophobic monomer selected from the group consisting of ethylhexyl acrylate, stearyl acrylate, octadecyl dimethyl allyl ammonium chloride, and n-lauryl-2-methylacrylamide in a concentration ranging from 0.01 to 0.1 wt % and sufficient to shorten the shear recovery time of the fluid system compared to the shear recovery time of the fluid system without the polymer such that following exposure to shear conditions greater than 500 s$^{-1}$, the fluid recovers at least 50% of its final viscosity within 50 seconds.

2. The method of claim 1, wherein the surfactant is according to Formula I:

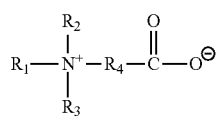

Formula I wherein R$_1$ is selected from the group consisting of alkyl, alkenyl, alkylarylalkylene, alkenylarylalkylene, alkylaminoalkylene, alkenylamino-alkylene, alkylamidoalkylene, and alkenylamidoalkylene, wherein each of said alkyl groups contain from about 14 to about 24 carbon atoms and wherein said alkylene groups contain from about 1 to about 6 carbon atoms; and $R_2$, $R_3$ and $R_4$ are the same or different and are alkyl or hydroxyalkyl of from 1 to about 5 carbon atoms, or $R_3$ and $R_4$ or $R_2$ together with the nitrogen atom to which they are bonded form a heterocyclic ring of up to 6 members.

3. The method of claim 1, wherein the surfactant is according to Formula II:

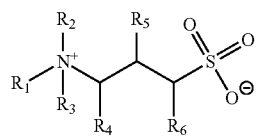

Formula II wherein $R_1$ is a hydrocarbyl group and contains from about 8 to about 30 carbon atoms; $R_2$ and $R_3$ are individually hydrogen or a methyl group; $R_4$ and $R_5$ or $R_6$ are individually hydrogen or a hydroxyl group with the provision that at least one of the $R_4$ and $R_5$ or $R_6$ is a hydroxyl groups.

4. The method of claim 1, wherein the surfactant is according to Formula III:

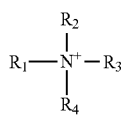

Formula III wherein $R_1$ is a hydrocarbyl group and contains from about 8 to about 30 carbon atoms; and $R_2$, $R_3$ and $R_4$ are the same or different and are alkyl or hydroxyalkyl of from 1 to about 5 carbon atoms, or $R_3$ and $R_4$ or $R_2$ together with the nitrogen atom to which they are bonded form a heterocyclic ring of up to 6 members.

5. The method of claim 1, wherein the surfactant is according to Formula IV:

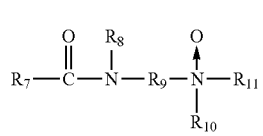

Formula IV wherein $R_7$ is an aliphatic group of from about 7 to about 30 carbon atoms; $R_9$ is a divalent alkylene group of from 2 to about 6 carbon atoms; $R_{10}$ and $R_{11}$ are the same or different and are alkyl or hydroxyalkyl of from 1 to about 4 carbon atoms, or $R_{10}$ and $R_{11}$ together with the nitrogen atom to which they are bonded form a heterocyclic ring of up to 6 members; and $R_8$ is hydrogen or a alkyl or hydroxyalkyl group of from 1 to about 4 carbon atoms.

6. The method of claim 1, wherein the two water-soluble monomers are acrylic acid and 2-acrylamido-2methylpropanesulfonic acid.

7. The method of claim 1, wherein the hydrophobic monomer is ethylhexyl acrylate.

8. A method of reducing shear recovery time of a viscosifying surfactant fluid system comprising introducing a viscosifying surfactant fluid system into a subterranean formation, wherein the fluid comprises a major portion of a surfactant and a hydrophobically-modified associative polymer, wherein the hydrophobically modified associative polymer consists of acrylic acid, 2-acrylamido-2-methylpropanesulfonic acid, and ethylhexyl acrylate in a concentration sufficient to shorten the shear recovery time of the fluid system compared to the shear recovery time of the fluid system without the polymer such that following exposure to shear conditions greater than 500 $s^{-1}$, the fluid recovers at least 50% of its final viscosity within 50 seconds.

* * * * *